US011132165B2

(12) United States Patent
Noyes et al.

(10) Patent No.: US 11,132,165 B2
(45) Date of Patent: Sep. 28, 2021

(54) METHOD FOR ARCHIVING A COLLABORATION SESSION WITH A MULTIMEDIA DATA STREAM AND VIEW PARAMETERS

(71) Applicant: BLUEBEAM, INC., Pasadena, CA (US)

(72) Inventors: Peter Noyes, Pasadena, CA (US); Richard Lee, Pasadena, CA (US); Don Jacob, Pasadena, CA (US)

(73) Assignee: BLUEBEAM, INC., Pasadena, CA (US)

(*) Notice: Subject to any disclaimer, the term of this patent is extended or adjusted under 35 U.S.C. 154(b) by 527 days.

(21) Appl. No.: 15/236,209

(22) Filed: Aug. 12, 2016

(65) Prior Publication Data

US 2017/0046113 A1    Feb. 16, 2017

Related U.S. Application Data

(60) Provisional application No. 62/204,921, filed on Aug. 13, 2015.

(51) Int. Cl.
*G06F 3/00* (2006.01)
*G06F 9/00* (2006.01)
(Continued)

(52) U.S. Cl.
CPC .......... *G06F 3/1454* (2013.01); *G06F 40/169* (2020.01); *G06F 40/174* (2020.01);
(Continued)

(58) Field of Classification Search
CPC ...... G06F 3/1454; G06F 17/243; G06F 3/165; G06F 17/241; H04L 65/4076;
(Continued)

(56) References Cited

U.S. PATENT DOCUMENTS 6,304,648 B1 * 10/2001  Chang .................. H04M 3/567
                                                        348/14.08
6,535,909 B1 *  3/2003  Rust .................. G06F 17/30861
                                                        707/E17.107
(Continued)

OTHER PUBLICATIONS

Frame.IO, Inc., Home Page https://frame.io, Sep. 27, 2016, 10 pages, New York City, New York.
(Continued)

*Primary Examiner* — Kieu D Vu
*Assistant Examiner* — Anita D. Chaudhuri
(74) *Attorney, Agent, or Firm* — Bookoff McAndrews, PLLC

(57) ABSTRACT

A method for archiving a collaboration session regarding visual content is disclosed. A collaboration session is established from a collaboration server with participant nodes. The visual content is transmitted to the participant nodes. A first multimedia data stream, an annotation data object associated with an annotation to the visual content in timed correlation to a first time reference within the first multimedia data stream, and view parameters are received. A first session record entry associated with the multimedia data stream, the annotation data object, and the view parameters is stored into a session record. The session record includes a plurality of session record entries including the first session record entry. The session record is retrievable by other participant nodes for playing back of the collaboration session in sequence with the session record entries. The first session record entry is transmitted to other participant nodes.

18 Claims, 11 Drawing Sheets

(51) Int. Cl.
  *G06F 17/00* (2019.01)
  *G06F 3/14* (2006.01)
  *H04L 29/06* (2006.01)
  *G06F 40/169* (2020.01)
  *G06F 40/174* (2020.01)

(52) U.S. Cl.
  CPC ........ *H04L 65/1069* (2013.01); *H04L 65/403* (2013.01); *H04L 65/4015* (2013.01); *H04L 65/4076* (2013.01); *G09G 2370/022* (2013.01); *G09G 2370/027* (2013.01); *G09G 2370/20* (2013.01)

(58) Field of Classification Search
  CPC ............... H04L 65/1069; H04L 65/403; H04L 65/4015; G09G 2370/022; G09G 2370/027; G09G 2370/20
  See application file for complete search history.

(56) References Cited

U.S. PATENT DOCUMENTS

| | | | |
|---|---|---|---|
| 6,859,909 B1 | 2/2005 | Lerner et al. | |
| 6,904,392 B1 | 6/2005 | Marty et al. | |
| 7,650,565 B2 | 1/2010 | Ford, III | |
| 8,443,280 B2 | 5/2013 | Noyes | |
| 2004/0107270 A1* | 6/2004 | Stephens | G06F 17/30017 709/219 |
| 2004/0263636 A1* | 12/2004 | Cutler | H04N 7/15 348/211.12 |
| 2006/0026502 A1* | 2/2006 | Dutta | G06Q 10/10 715/230 |
| 2009/0225076 A1* | 9/2009 | Vlietinck | G06T 15/005 345/419 |
| 2010/0142721 A1* | 6/2010 | Wada | H04R 3/005 381/77 |
| 2011/0302506 A1 | 12/2011 | Noyes | |
| 2012/0296914 A1 | 11/2012 | Romanov et al. | |
| 2013/0249906 A1 | 9/2013 | Gunderson et al. | |
| 2015/0149540 A1 | 5/2015 | Barker et al. | |
| 2015/0221319 A1* | 8/2015 | Cartwright | G10L 19/008 704/205 |

OTHER PUBLICATIONS

Copenheaver, Blaine, PCT Notification of Transmittal of the International Search Report and the Written Opinion of the International Searching Authority, dated Dec. 20, 2016, pp. 1-15.

* cited by examiner

RECIPIENT

DOCUMENT REVIEW SESSION
ATTENDEES
   djacob (xx@asdf.com)
   Peter  (yy@asdf.com)
   Rich   (zz@asdf.com)

DOCUMENTS
   OFFICE_PLAN.PDF

RECORD

| # | MESSAGE | DATE | TIME | DOCUMENT | PAGE |
|---|---|---|---|---|---|
| 1 | djacob: JOINED SESSION | x/xx/xx | 20:59:01 | OFFICE PLA... | 1 |
| 2 | Peter: JOINED SESSION | x/xx/xx | 21:02:15 | OFFICE PLA... | 1 |
| 3 | Peter: Begin Talking | x/xx/xx | 21:02:19 | OFFICE PLA... | 1 |
| 4 | Rich: JOINED SESSION | x/xx/xx | 21:03:00 | OFFICE PLA... | 1 |
| 5 | djacob: ADD PEN | x/xx/xx | 21:03:12 | OFFICE_PLA... | 1 |
| 6 | djacob: ADD PEN | x/xx/xx | 21:03:30 | OFFICE_PLA... | 1 |
| 7 | djacob: Begin Talking | x/xx/xx | 21:03:31 | OFFICE PLA... | 1 |
| 8 | Peter: ADD CALLOUT (Did this happen yet?) | x/xx/xx | 21:05:34 | OFFICE PLA... | 1 |
| 9 | djacob: No. Send a notice To engineering. | x/xx/xx | 21:06:03 | OFFICE PLA... | 1 |
| 10 | Rich: Approved. | x/xx/xx | 21:06:09 | OFFICE PLA... | 1 |

FIG. 16

METHOD FOR ARCHIVING A COLLABORATION SESSION WITH A MULTIMEDIA DATA STREAM AND VIEW PARAMETERS

CROSS-REFERENCE TO RELATED APPLICATIONS

This non-provisional patent application and claims priority to and the benefits of U.S. Provisional Patent Application Ser. No. 62/204,921, entitled STUDIO VOICE ARCHIVING INVENTION, filed on Aug. 13, 2015, the entire contents of which are herein incorporated by reference.

STATEMENT RE: FEDERALLY SPONSORED RESEARCH/DEVELOPMENT

Not Applicable

BACKGROUND

1. Technical Field

The present disclosure relates generally to the facilitation of collaborative work efforts amongst multiple users. More particularly, the present disclosure relates to methods for archiving a collaboration session regarding visual content and related multimedia data stream and view parameters.

2. Related Art

The core of modern business is information, with its creation, distribution, and management being primary functions. Information or content can be presented in a variety of different ways, including word processing documents, spreadsheets, graphics, photographs, engineering drawings, architectural plans, and so forth. In electronic form, these are all generally referred to as documents, and may be generated by software applications that are specific thereto. A typical workflow in the enterprise involves various personnel collaborating to create, review, and/or edit such documents, and because of advancements in high-speed data communications and computing capabilities, these processes can involve remote personnel.

Due to the existence of many different computing platforms having a wide variety of operating systems, application programs, and processing and graphic display capabilities, it has been recognized by those in the art that a device-independent, resolution-independent file format was necessary to facilitate such exchange. In response to this need, the Portable Document Format (PDF), amongst other competing formats, has been developed.

The PDF standard is a combination of a number of technologies, including a simplified PostScript interpreter subsystem, a font embedding subsystem, and a storage subsystem. As those in the art will recognize, PostScript is a page description language for generating the layout and the graphics of a document. Further, per the requirements of the PDF storage subsystem, all elements of the document, including text, vector graphics, and raster (bitmap) graphics, collectively referred to herein as graphic elements, are encapsulated into a single file. The graphic elements are not encoded to a specific operating system, software application, or hardware, but are designed to be rendered in the same manner regardless of the specificities relating to the system writing or reading such data. The cross-platform capability of PDF aided in its widespread adoption, and is now a de facto document exchange standard. Although originally proprietary, PDF has been released as an open standard published by the International Organization for Standardization (ISO) as ISO/IEC 32000-1:2008. Currently, PDF is utilized to encode a wide variety of document types, including those composed largely of text, and those composed largely of vector and raster graphics. Due to its versatility and universality, files in the PDF format are often preferred over more particularized file formats of specific applications. As such, documents are frequently converted to the PDF format.

From the user interface perspective, PDF documents are typically rendered as a static, graphical image, in which individual elements thereof such as text, pictures, and other elements are not editable. However, one of several improvements that have been made since the initial releases of PDF readers, writers, and the standard itself, is the support for adding annotations to a base document. Such annotations are graphically overlaid or "placed" on the underlying document, with placement being precisely controlled by the user. Thus, the functionality is similar to graphic illustration/design and image manipulation applications where various objects can be positioned on a document canvas by navigating a cursor to a desired location and providing a subsequent input to make placement permanent. Before positioning the cursor, the object to be placed, such as a geometric primitive, a text box, or the like, is selected.

Conventional implementations of the annotation feature are used to facilitate a linear workflow, where one user creates an initial version of a document, and distributes/emails the same to colleagues for review, comments, and amendments. Thereafter, upon receiving comments and amendments, the primary author incorporates them in to the document, and distributes it again in a second revision cycle. For uncomplicated collaboration environments that involve a minimal number of participants and a one-to-many hierarchy where there is little interaction among the downstream participants, this approach is adequate. With the addition of participants, and a change in the workflow hierarchy to many-to-many where the participants carry on several concurrent revision dialogues, the conventional implementation quickly becomes unmanageable. Numerous versions of the document may be distributed to participants, and it is uncertain if the version that one participant is working on is, indeed, the latest version existing amongst all of the participants. For example, it is possible for one user to interrupt the chain of revisions by working off an earlier version that did not incorporate any subsequent revisions that may have been made by others. Even though that version may be the latest in time, it does not reflect the latest in the progress of the document. This problem is compounded as additional participants make revisions to the incorrect latest version of the document. Although procedural discipline may be enforced in the workflow, the integrity of the process nevertheless depends upon the human factor, and is thus subject to a significant risk of error.

One alternative to the foregoing cyclical collaboration practice is real-time conferencing, where a single primary participant hosts several secondary participants. This is also known as application sharing, where the primary participant manipulates the document directly through a local application, while the secondary participants are presented with a dynamically updated screen view of the application as the document is edited. It is possible for the secondary participants to manipulate the document by remote input and temporarily taking control of the application.

There are several limitations, however, the first being the substantial bandwidth requirements to transmit what is essentially video data to the remote participants. Since the conference is conducted in real-time, by definition, it requires that all participants be at least partially engaged during the conference. Therefore, it may not be as convenient to the participants as the previously described document distribution approach where revisions and comments may be made as the various participants' time allows.

Traditionally web meetings are done via screen sharing with voice and/or chat communications. In a traditional meeting only a single user has control of a screen at any one time and all remote users are forced to see the shared visual content from same exact view that everyone else sees. Additionally, to archive an online meeting such as this involves capturing a copy of the screen as a video feed with the audio. These videos are relatively large in terms of memory requirements and cumbersome to work with. However, having the ability to effectively review a collaboration session or web meeting is highly valuable to gain an understanding of the circumstances and context of the meeting or collaboration at any given point in time.

Because conventional collaboration and online meeting approaches are deficient for a variety of reasons as noted above, there is a need in the art for any improved method for recording or archiving online meeting and collaboration sessions in comparison to the prior art.

BRIEF SUMMARY

In accordance with one embodiment of the present disclosure, a method for archiving a collaboration session regarding visual content is contemplated. The method includes establishing a collaboration session from a collaboration server with a plurality of participant nodes. The method further includes transmitting the visual content to the participant nodes from the collaboration server. The method further includes receiving at the collaboration server a first multimedia data stream associated with a first one of the plurality of participant nodes. The method further includes receiving at the collaboration server from the first one of the plurality of participant nodes an annotation data object associated with an annotation to the visual content in timed correlation to a first time reference within the first multimedia data stream. The method further includes receiving at the collaboration server from the first one of the plurality of participant nodes view parameters of the first one of the plurality of participant nodes in timed correlation to the first time reference. The method further includes generating a first session record entry associated with the received first multimedia data stream, the annotation data object, and the view parameters. The method further includes storing the generated first session record entry into a session record specific to the collaboration session and residing on the collaboration server. The session record includes a plurality of session record entries including the generated first session record entry. The session record is retrievable by any one of the participant nodes for playing back of the collaboration session in sequence with the session record entries. The method further includes transmitting the first session record entry from the collaboration server to one or more of the other ones of the plurality of participant nodes.

According to various embodiments, the multimedia data stream may be an audio data stream. The visual content may be a portable document format (PDF) document. The annotation data object may be generated in response to user input associated with placement of the annotation in relation to the visual content locally on the first one of the plurality of participant nodes. A one of the view parameters may be selected from a group consisting of: dots-per-inch settings of a display device for the first one of the plurality of participant nodes, window width and height of the visual content as displayed on the first one of the plurality of participant nodes, zoom factor of the visual content as displayed on the first one of the plurality of participant nodes, rotation of the visual content as displayed on the first one of the plurality of participant nodes, offset of the visual content as displayed on the first one of the plurality of participant nodes, document page number of the visual content as displayed on the first one of the plurality of participant nodes, display type of the visual content as displayed on the first one of the plurality of participant nodes, and a 3D transformation matrix.

The method may further include receiving at the collaboration server from the first one of the plurality of participant nodes a broadcast chat message data object associated with a broadcast chat message in timed correlation to a second time reference within the multimedia data stream. The method may further include receiving at the collaboration server from the first one of the plurality of participant nodes second view parameters of the first one of the plurality of participant nodes in timed correlation to the second time reference. The broadcast chat message data object may be generated in response to user input associated with entry of chat text separate from the visual content locally on the first one of the plurality of participant nodes. The method may further include receiving at the collaboration server a second multimedia data stream associated with a second one of the plurality of participant nodes. The method may further include generating a second session record entry associated with the received second multimedia data stream, and storing the generated second session record entry into the session record specific to the collaboration session and residing on the collaboration server. The session record may include a plurality of session record entries including the generated first session record entry and the generated second session record entry. The session record may be retrievable by any one of the participant nodes for playing back of the collaboration session in sequence with the session record entries. The multimedia data stream may include an audio data stream and the method may further include detecting audible characteristics in the audio data stream in comparison to a threshold value associated with vocal sounds. The method may further include establishing a time reference in relation to the detected audible characteristics.

Another embodiment of the present disclosure provides a method for archiving a collaboration session from a local node regarding visual content viewable by a plurality of users on remote nodes. The method includes transmitting the visual content to a remote collaboration server from the local node. The visual content is associated with the collaboration session. The method further includes receiving a local data object associated with the visual content on the local node. The visual content is displayed on the local node in accordance with a set of local view parameters particular to the receipt of the local data object. The method further includes transmitting to the collaboration server a first multimedia data stream associated with the first local node. The method further includes transmitting to the collaboration server from the local node an annotation data object associated with an annotation to the visual content in timed correlation to a first time reference within the first multimedia data stream. The method further includes transmitting to the collaboration server from the local node view parameters of the local node in timed correlation to the first time reference. The method further includes generating a session data object from the local data object on the local node. The session data object includes the first multimedia data stream, the annotation data object and the view parameters. The method further includes transmitting the session data object and a broadcast request to the remote collaboration server from the local node. The broadcast request is specifically associated with the transmitted session data object and the transmitted session data object being stored in a session record as a first session record entry generated therefrom, the session record including a plurality of session record entries including the generated first session record entry and being retrievable by the local node for playing back the collaboration session in sequence with the session record entries.

The annotation data object may be generated in response to user input associated with placement of the annotation on the visual content locally on the local node. A one of the view parameters may be selected from a group consisting of: dots-per-inch settings of a display device for the local node, window width and height of the visual content as displayed on the local node, zoom factor of the visual content as displayed on the local node, rotation of the visual content as displayed on the local node, offset of the visual content as displayed on the local node, document page number of the visual content as displayed on the local node, display type of the visual content as displayed on the first one of the plurality of participant nodes, and a 3D transformation matrix.

Another embodiment of the present invention provides for a method for accessing an archived collaboration session from a local node regarding visual content viewable by a plurality of users on remote nodes. The method includes receiving the visual content on the local node from a remote collaboration server. The visual content is associated with the archived collaboration session. The method further includes receiving a first session data object on the local node from the remote collaboration server. The first session data object is associated with a first one of the remote nodes and being derived from a corresponding session record entry of a session record specific to the archived collaboration session and residing on the collaboration server. The method further includes generating on the local node an inventory of the received first session data object and other prior received session data objects from other remote nodes in the archived collaboration session. The first session data object includes a first multimedia data stream, an annotation data object associated with an annotation to the visual content in timed correlation to a first time reference within the first multimedia data stream, and view parameters of the first one of the remote nodes in timed correlation to the first time reference. The method further includes receiving a selection of the first session data object from the inventory on the local node. The method further includes displaying the visual content on the local node in timed correlation in relation to the first time reference.

According to various embodiments, the displaying of the visual content on the local node may be in substantial conformity with the view parameters. The displaying of the visual content may be temporally prior to the first time reference. A one of the view parameters may be selected from a group consisting of: dots-per-inch settings of a display device for the first one of the plurality of participant nodes, window width and height of the visual content as displayed on the first one of the plurality of participant nodes, zoom factor of the visual content as displayed on the first one of the plurality of participant nodes, rotation of the visual content as displayed on the first one of the plurality of participant nodes, offset of the visual content as displayed on the first one of the plurality of participant nodes, document page number of the visual content as displayed on the first one of the plurality of participant nodes, display type of the visual content as displayed on the first one of the plurality of participant nodes, and a 3D transformation matrix.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 16 is an exemplary session report.

Common reference numerals are used throughout the drawings and the detailed description to indicate the same elements.

DETAILED DESCRIPTION

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as top and bottom, first and second, and the like are used solely to distinguish one entity from another without necessarily requiring or implying any actual such relationship or order between such entities.

A method for archiving a collaboration session regarding visual content is disclosed in accordance with various embodiments of the present invention. There are also disclosed methods for collaborating on visual content viewable by a plurality of users on remote nodes. In general, such methods involve an annotation to the visual content in timed correlation to a first time reference within a first multimedia data stream. Additional details of these methods will be discussed more fully below. It is understood that these methods may be implemented as one or more computer-executable instructions that can be stored on a data storage medium.

Figure 1:
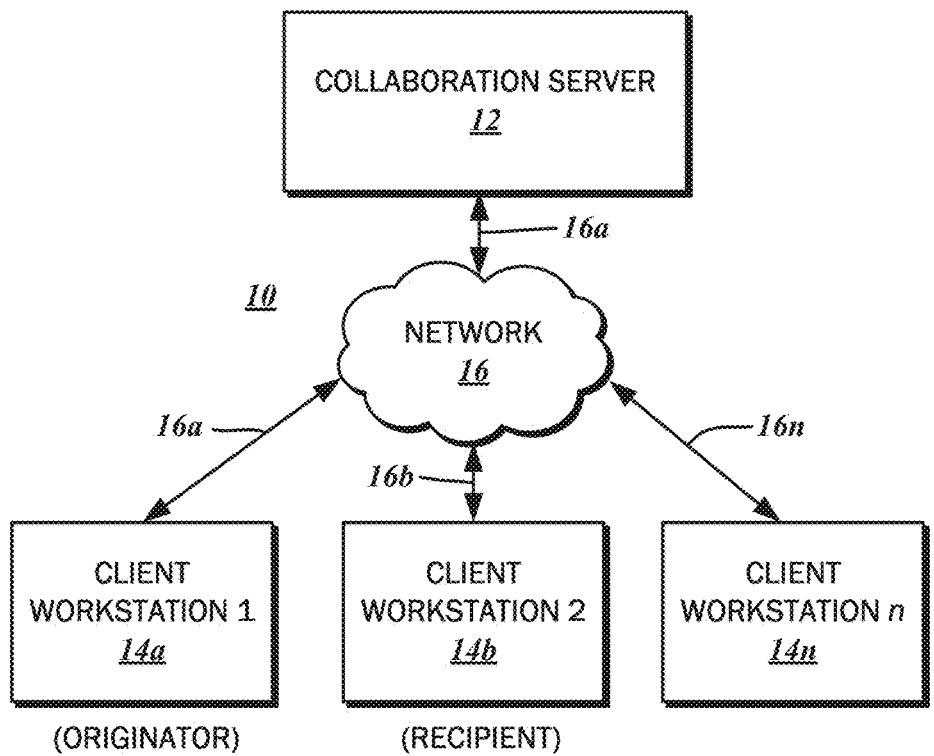
FIG. 1 is a block diagram illustrating an exemplary environment including a collaboration server and one or more client workstations.

The block diagram of FIG. 1 shows an exemplary environment 10 in which the method for coordinating visual content annotation may be implemented. Specifically, there is a collaboration server 12 that is in communication with one or more client workstations 14a-14n over the network 16. It is contemplated that the network 16 interconnects client workstations 14 that are remotely located, and thus may be the Internet or other type of wide area network, though local area implementations are also contemplated. In the context of the network 16 the client workstations 14a-14n are a plurality of nodes that communicate with the collaboration server 12. Network connections 16a-16n may thus be Internet Protocol Suite-compliant with a Transmission Control Protocol (TCP) component as well as a User Datagram Protocol (UDP) component. Depending on the needs of the services involved, the more reliable and ordered (albeit slower) delivery of data possible through a TCP connection may be more appropriate, or the faster but more unreliable delivery of data through a UDP connection may be more appropriate. Although any network modality may be utilized to transfer data from the client workstations 14 to the collaboration server 12 and vice versa, it will be appreciated that certain improvements may be realized if the protocol selection is tailored to the particular needs. Where an embodiment contemplates such a selection, those will be particularly noted. Along these lines, the specific network topology is presented by way of example only, however, and any other type of arrangement may be substituted.

The collaboration server 12 is understood to be a conventional server computer system having a processor capable of executing the noted instructions of the method, as well as a memory for storing the instructions and other related data. As part of its functionality of communicating with the client workstations 14 over the network 16 in some embodiments, the collaboration server 12 may be a web server including commercially available application or web services components such as the Windows Communication Foundation (WCF) from Microsoft Corporation of Redmond, Wash.

Figure 2:
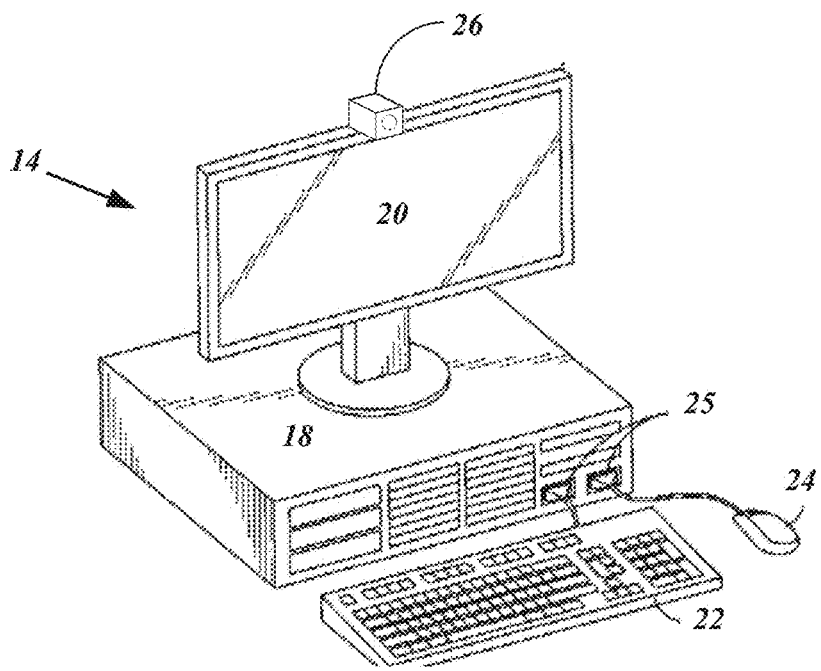
FIG. 2 is an exemplary client workstation that may be capable to perform functions for use with aspects of the present invention including a display monitor, a system unit, and input/output devices.

With reference to FIG. 2, one exemplary embodiment of the client workstation 14 may include a system unit 18 and a display monitor 20. The display monitor 20 graphically displays output from the data processing operations performed by the system unit 18. The display monitor 20 is a visual output device and includes some form of screen. The display monitor 20 may be of a Liquid Crystal Display (LCD) type, a Cathode Ray Tube (CRT) type, or any other suitable type of display. Devices such as a keyboard 22 and a mouse 24 are utilized to provide input to the data processing operations, and are connected to the system unit 18 via USB ports 25. Various other input and output devices may be connected to the system unit 18, and alternative interconnection modalities may be substituted with the USB ports, such as wireless connections. Devices such as a keyboard 22 and a mouse 24 are utilized to provide input to the data processing operations, and are connected to the system unit 18 via the USB ports.

An audio and/or visual (A/V) device, such as a webcam 26 may be provided and configured to receive A/V input for the creating of a multimedia data stream. The webcam 26 may include a video camera and a microphone. Separate camera and microphone components may be implemented. The webcam 26 may be connected to the system unit 18 via a wireless connection. The webcam 26 may be used to provide a video input of the user at the client workstation 14 as well as an audio input, such as for capturing audible sounds adjacent the client workstation 14. This is a particularly effective tool for conducting virtual meetings and online calls between remote users having similar webcam enabled workstations. Depending upon the particular input device or devices, the resultant multimedia data stream may be an audio/visual data stream, an audio only data stream and a video only data stream, or other detectable signals.

Figure 3:
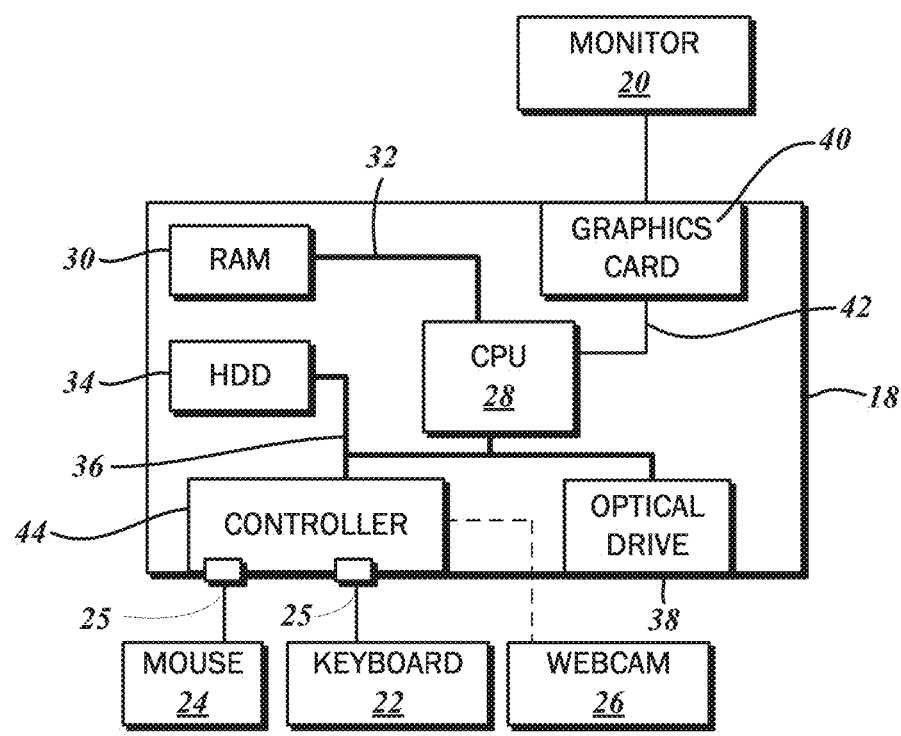
FIG. 3 is a block diagram showing the various components of the system unit in the exemplary client workstation of FIG. 2.

As shown in the block diagram of FIG. 3, the system unit 18 includes a Central Processing Unit (CPU) 28, which may represent one or more conventional types of such processors, such as an IBM PowerPC, Intel Pentium (x86) processors, and so forth. A Random Access Memory (RAM) 30 temporarily stores results of the data processing operations performed by the CPU 28, and is interconnected thereto typically via a dedicated memory channel 32. The system unit 18 may also include permanent storage devices such as a hard drive 34, which are also in communication with the CPU 28 over an input/output (I/O) bus 36. Other types of storage devices 38 such as tape drives, Compact Disc drives, and the like may also be connected. A graphics card 40 is also connected to the CPU 28 via a video bus 42, and transmits signals representative of display data to the display monitor 20. As indicated above, the keyboard 22 and the mouse 24 are connected to the system unit 18 over the USB ports 25. A controller 44 translates data and instructions to and from the CPU 28 for external peripherals that may be connected to associated USB ports or wirelessly connected via Bluetooth connectivity. Additional devices such as printers, microphones, speakers, and the like may be connected to the system unit 18.

The system unit 18 may utilize any operating system having a graphical user interface (GUI), such as WINDOWS from Microsoft Corporation of Redmond, Wash., MAC OS from Apple, Inc. of Cupertino, Calif., various versions of UNIX with the X-Windows windowing system, and so forth. The system unit 18 executes one or more computer programs, with the results thereof being displayed on the display monitor 20. Generally, the operating system and the computer programs are tangibly embodied in a computer-readable medium, e.g. one or more of the fixed and/or removable data storage devices including the hard drive 34. Both the operating system and the computer programs may be loaded from the aforementioned data storage devices into the RAM 30 for execution by the CPU 28. The computer programs may comprise instructions, which, when read and executed by the CPU 28, cause the same to perform or execute the steps or features of the various embodiments set forth in the present disclosure.

According to one embodiment, a user can interact with client workstation 14, specifically with the graphics being displayed on the monitor 20, via the mouse 24. The movement of a cursor generated on the monitor 20 is tied to the movement of the mouse 24, with further interactivity being provided with input from the mouse buttons. Input from the keyboard 22 also provides interactivity with the client workstation 14. This description refers to "clicking" the mouse buttons, "positioning" the cursor, "holding" the mouse button to "drag" an on-screen object, and so forth. It will be appreciated by those having ordinary skill in the art that such terms have well-understood meanings relative to interactions with the client workstation 14 through a graphical user interface, and also find correspondence to other input modalities such as pen/digitizers and the like.

The foregoing client workstation 14 represents only one exemplary apparatus suitable for implementing aspects of the present invention. As such, the client workstation 14 may have many different configurations and architectures. Any such configuration or architecture may be readily substituted.

Figure 4:
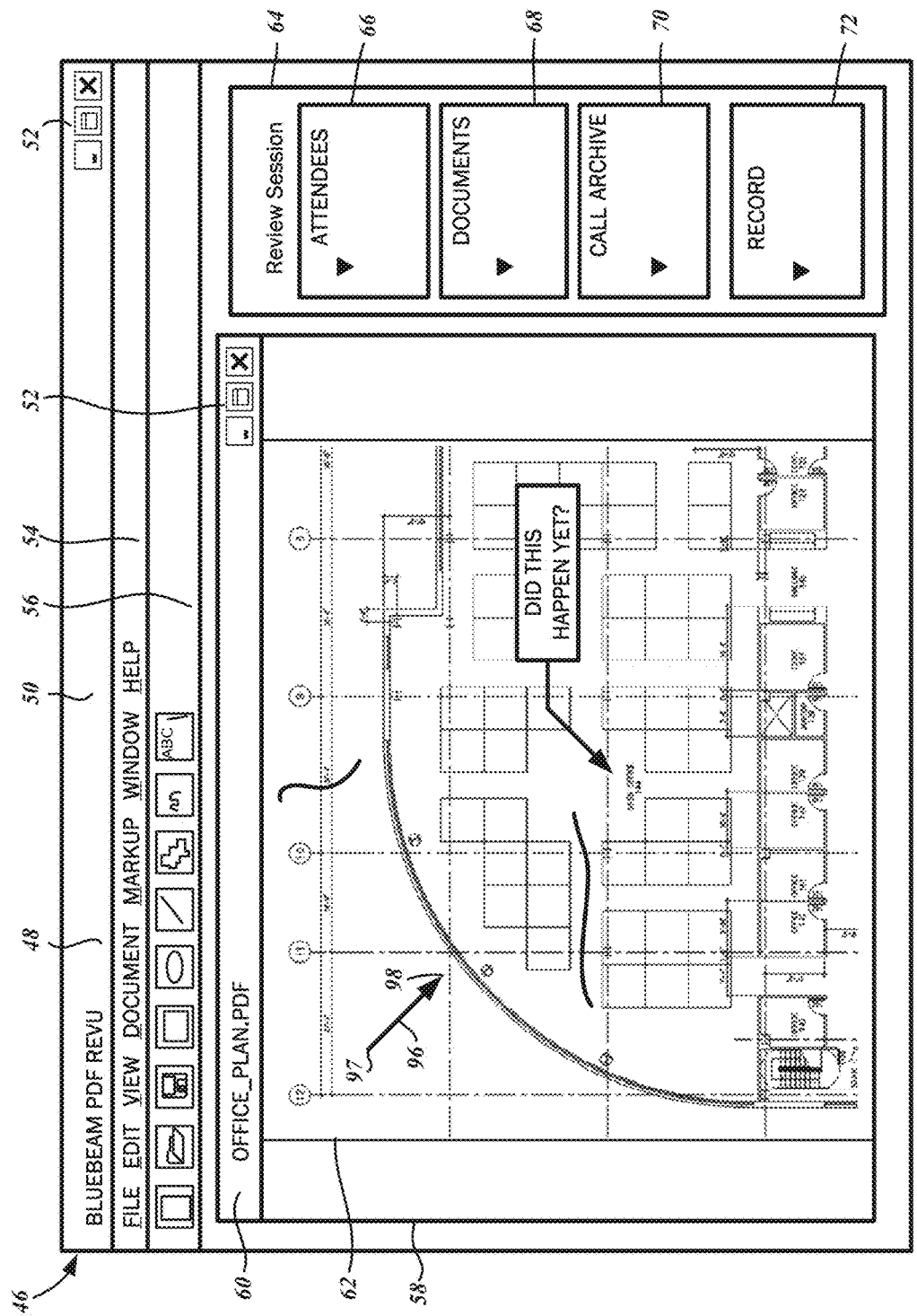
FIG. 4 is an exemplary graphical user interface of a software application for annotating visual content.

FIG. 4 illustrates one exemplary graphical user interface 46 of a software application for collaboratively reviewing and annotating visual content. In one exemplary embodiment, the visual content is a Portable Document Format (PDF) document that includes text and graphics. However, as utilized herein, the term visual content is intended to encompass any other types of information that can be displayed on the monitor 20, such as word processing documents, spreadsheets, photographs, graphics layouts, three-dimensional models, video, graphical content such as medical X-ray images, and so forth. While various exemplary embodiments set forth below are described in relation to the PDF application, it will be appreciated that the same features may be incorporated into other software applications for different visual content. As indicated above, the software application runs on a windowing system, and accordingly has a number of interface elements that are common to such applications. Each of the participating client workstations 14 are understood to have a copy of the software application installed thereon. The copies of the software application need not be identical, however, and some client workstations may have a copy with a differing set of functionalities than another such as with trial versions, reader-only versions, and so forth. Those having skill in the art will recognize that the software application is understood to refer to any software program embodying the contemplated methods of the present disclosure.

In further detail, the functional, interactive features of the graphical user interface 46 are contained within a main window 48 that includes a title bar 50 with basic window controls 52 that variously minimize, maximize, and close the main window 48. In addition, the main window 48 includes a menu bar 54, from which various functions of the reviewing software application may be invoked via activated pull-down menus. So that commonly utilized functions such as opening files, saving changes to the currently opened file, and so forth are readily accessible, there is also a tool bar 56. It is contemplated that annotations of various types can be placed and manipulated via the graphical user interface 46. Selection of the annotation type may be made with the respective icons of the tool bar 56.

Annotations are understood to be a type of data object that is associated with an underlying document, and generally refers to a conceptual entity corresponding to a contiguous block of memory at a specific location and with a specific size, and is defined by one or more properties that define its characteristics. It is understood that an annotation can be a geometric primitive such as a point, a line (single segment or multi-segment), an ellipse, a polygon, or the like, as well as specialized annotation object such as callout boxes. To further define the features of the annotation, various parameter attributes can be associated therewith such as dimensions, color, line thickness, positioning coordinates, and others that are specific to that annotation type. Although annotations are stored in the document, they generally do not become a part of the document; visually, the annotations are overlaid on a separate layer of the document.

Within the main window 48 is a workspace window 58, which includes a sub-title bar 60 and basic window controls 52. There is a document 62 that is rendered within the workspace window 58. In the example shown, the document 62 is an architectural drawing comprised of various graphical elements including lines, arcs, text. Within the sub-title bar 60, there may be a descriptor of the document 62, which is named "OFFICE_PLAN.PDF." Although in the exemplary embodiment the document is a PDF file structured in accordance with the standard as discussed above, it is expressly contemplated that any other desired document format may be rendered in the workspace window 58.

Specific to the collaboration features contemplated in the present disclosure, the graphical user interface 46 also includes a session window 64. Within the session window 64 is an attendee sub-window 66 that lists the participants in the collaboration session, as well as a documents sub-window 68 that lists the documents being reviewed and annotated in the collaboration session. There is also a call archive sub-window 70 that facilitates a play back function of a selected archived collaboration session. There is also a record sub-window 72 that lists each of the actions, call activities and chat dialogues occurring during the collaboration session. The record sub-window 72 may further include play back features with respect to multimedia data streams captured during the collaboration session. Further details regarding the contents of these sub-windows will be considered below, and the uses for the same will become apparent. The specific visual appearance and arrangement of the session window 64 and its constituent sub-windows has been presented by way of example only and any other configuration may be readily substituted.

Figure 5:
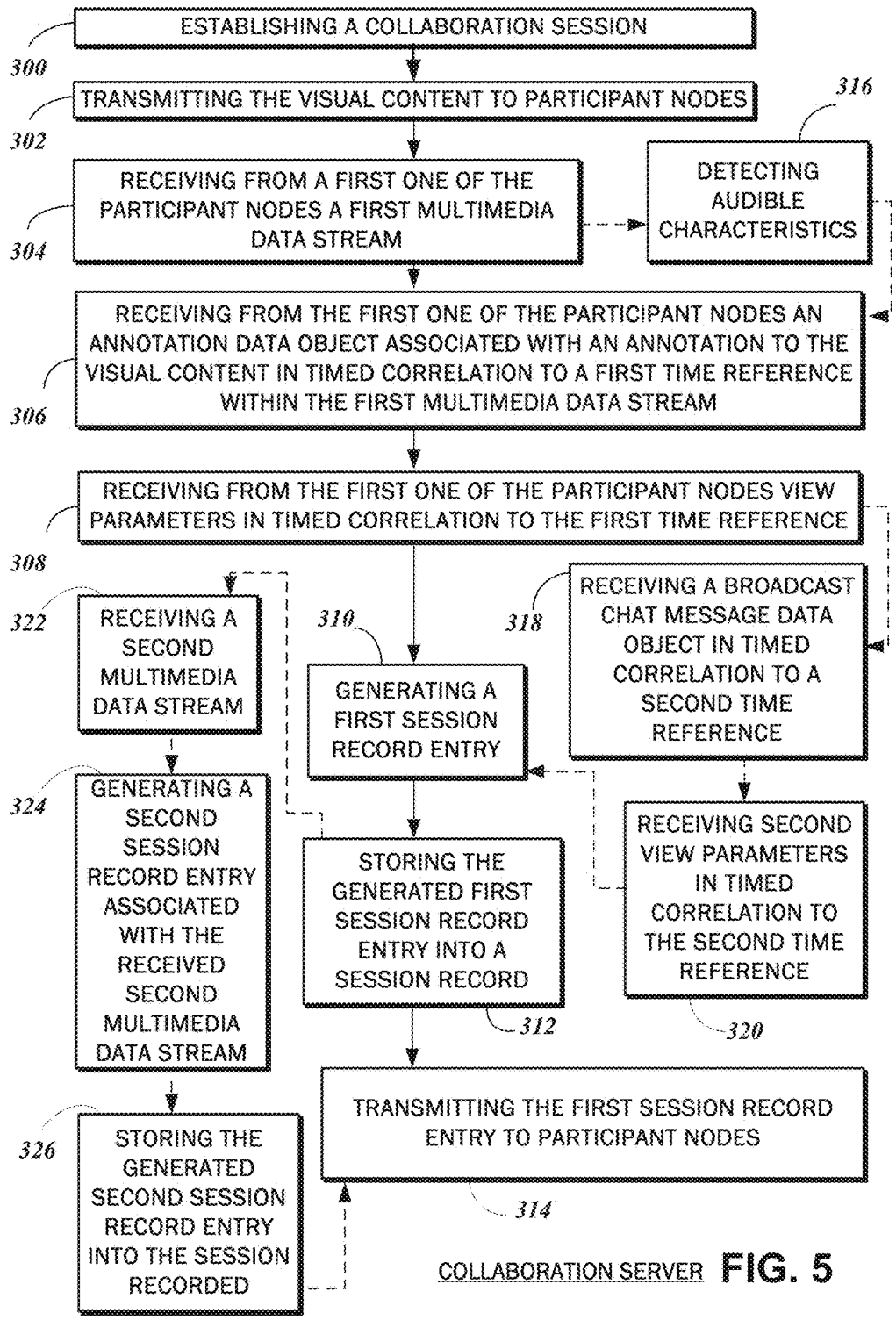
FIG. 5 is a flowchart illustrating a method for archiving a collaboration session regarding visual content is disclosed in accordance with one embodiment of the present disclosure.
Figure 6:
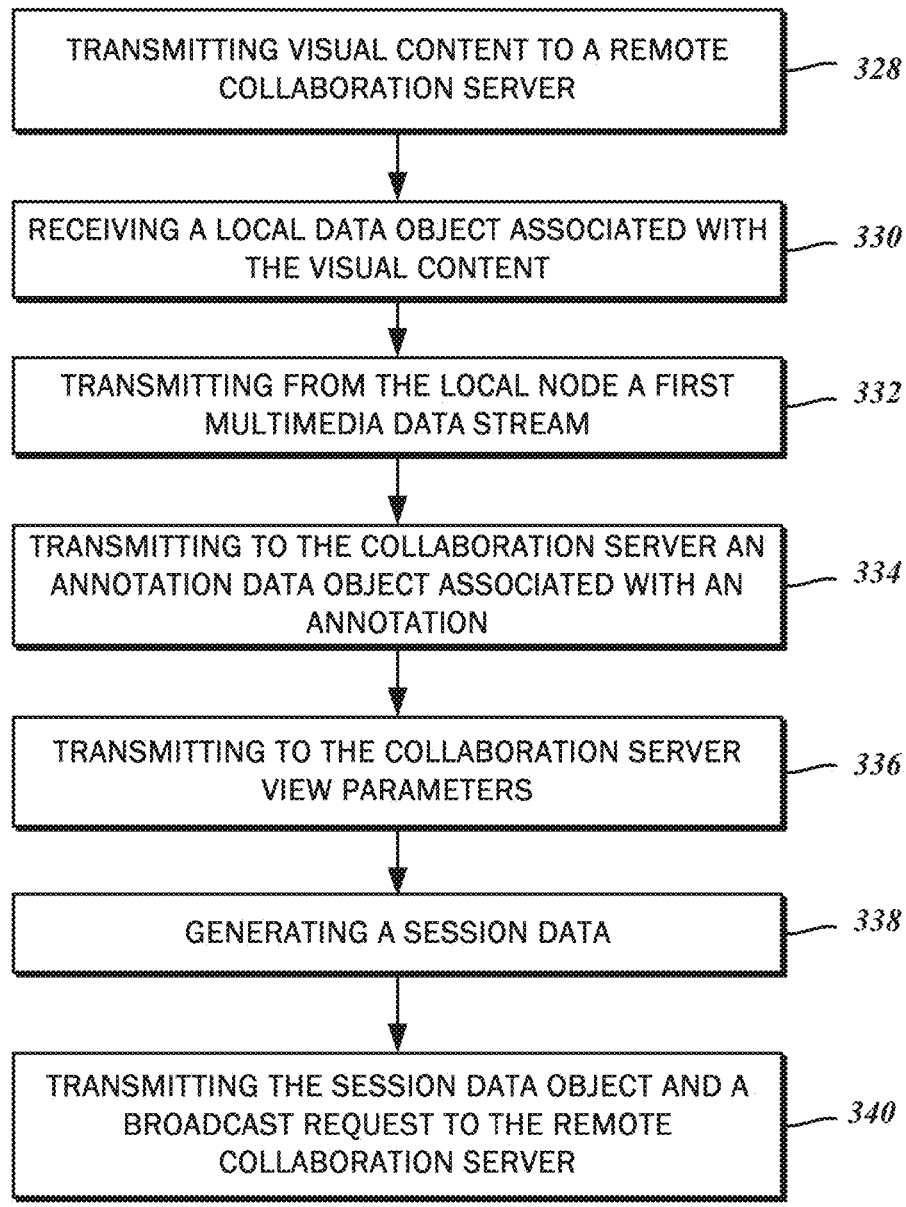
FIG. 6 is a flowchart illustrating one method for collaborating on visual content viewable by a plurality of users on remote nodes.
Figure 7:
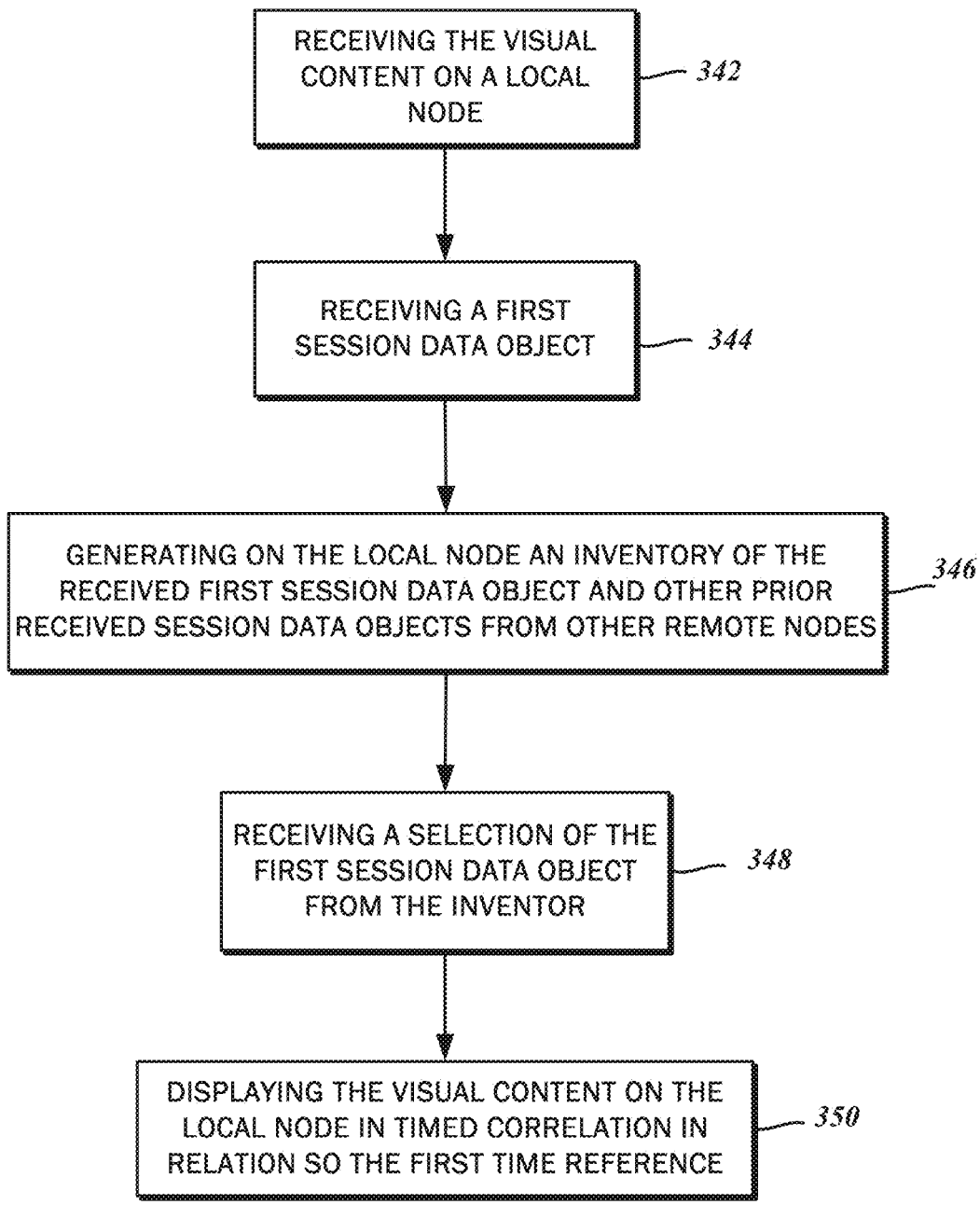
FIG. 7 is a flowchart illustrating another method for collaborating on visual content viewable by a plurality of users on remote nodes.

Various aspects of collaboration on visual content are contemplated from the perspective of a first client workstation 14a, which is designated as the originator, from the perspective of a second client workstation 14b, which is designated as the recipient, and from the perspective of the collaboration server 12, which manages the interaction between an among remote nodes, such as the originator, the recipient, and other client workstations. The flowcharts of FIGS. 5, 6, and 7 illustrate the steps of the various methods that are specific to those aspects. However, the steps of such methods are understood not to take place concurrently in the overall collaboration workflow; for example, the first step from the perspective of the originator does not necessarily correspond to the first step from the perspective of the recipient. Accordingly, the steps will be described in relation to a typical exemplary workflow and their relation to other, prefatory steps that are optional, and therefore omitted, from the flowcharts.

With reference to the flowchart of FIG. 5, the collaboration workflow begins with a step 300 of establishing a collaboration session from the collaboration server 12 with a plurality of participant nodes, such as client work stations 14. A collaboration session is generally understood to be an interactive exchange of comments (chat messages), annotations, and other such data between the client workstations 14, which are participants in that collaboration session. The collaboration session may be defined by visual content, such as one or more documents, that are reviewed and/or manipulated, and by the participants involved from their respective nodes of workstations 14. Additionally, each collaboration session may have associated therewith permissions as to which participants can join that collaboration session, and the identity of the participant initiating that collaboration session. Information for each defined collaboration session is stored in the collaboration server 12, which may be hosted by a third party independent of the client workstations 14, or by the same entity that owns or manages the client workstations 14. It is contemplated that the online collaboration or calling functionality and related software programming may be chosen from those which are well known to one of ordinary skill in the art. Furthermore, each collaboration session may include generation of multimedia data streams from each of the participant nodes which are transmitted to the collaboration server 12. The resultant multimedia data streams may be audio/visual data streams, audio only data streams and video only data streams, or other detectable signals. For example, a web call may be used to establish a collaboration session, which may include both audio and video feeds (in the case of a web cam) or just audio feed as the case may be. The multimedia data stream may be transmitted during or after the collaboration session and may take the form of a continuously transmitted signal or one or more electronic packages of data. The multimedia data streams may be generated via the participant nodes themselves or in tandem with a separate collocated device, such as a common telephone system.

In accordance with various embodiments of the present disclosure, a collaboration session can span an indefinite period of time, that is, once initiated, a session is accessible for other participants to join and exit until a record thereof is removed from the collaboration server 12. The collaboration session is asynchronous because it is not necessary for each of the participants to join at the same time to work on the document. However, if desired, the participants can join simultaneously, or in a synchronous collaboration session, to work on the document and discuss it in real-time. Various embodiments of the present disclosure contemplate features that enable such asynchronous/synchronous collaboration sessions.

Figure 8:
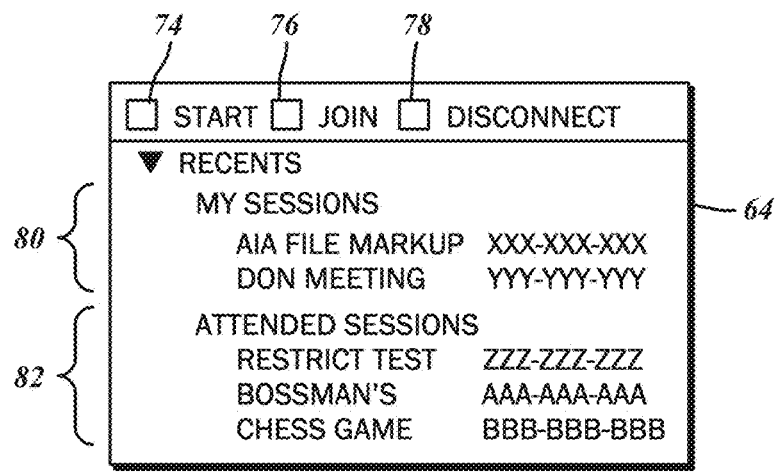
FIG. 8 is an example session window for starting or joining collaboration sessions.

With reference to FIG. 8, in an alternative representation of the session window 64 or portion thereof, the user is provided with an option to start a new session by selecting a start icon 74, or joining an existing session by selecting a join icon 76. To the extent that the client workstation 14 is already connected to an existing session, a disconnect icon 78 can be selected to exit the session. Within the session window 64, a list of sessions started by the user is shown in a "my sessions" section 80, while a list of other sessions joined by the user is shown in an "attended sessions" section 82. By selecting an entry from either of these sections, the corresponding session can be joined.

Figure 9:
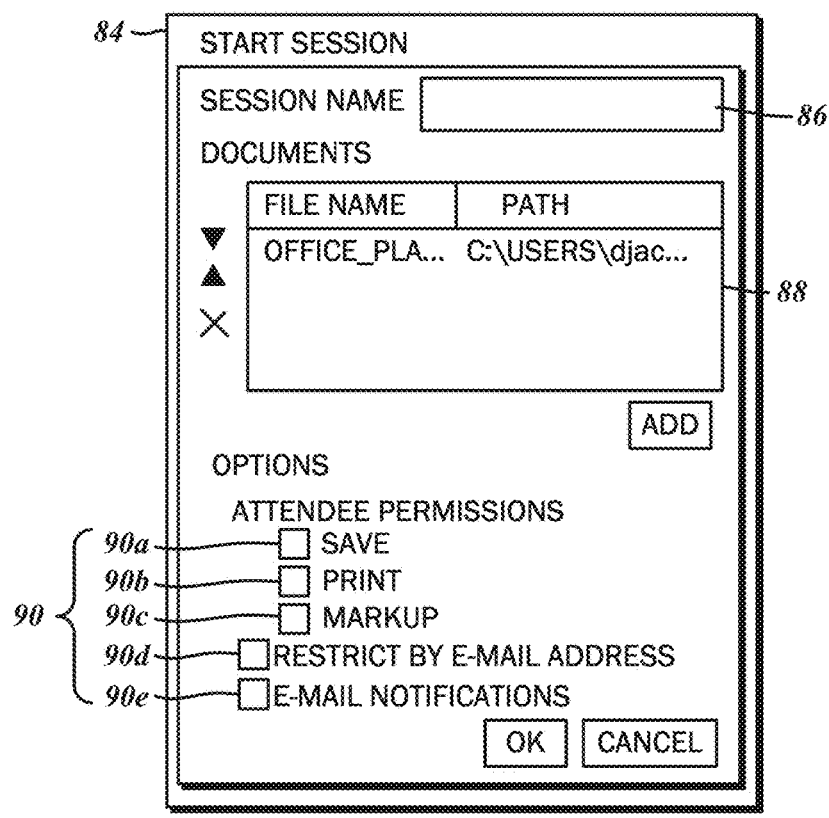
FIG. 9 is an example dialog box for starting a new collaboration session.

As best shown in an exemplary dialog box 84 shown in FIG. 9, a variety of parameters for the new collaboration session may be set therein. A name identifying the collaboration session may be entered into a session name input 86. The name entered therein is what will be displayed in the list of sessions in the session window 64, above. The various documents that are to be the part of the collaboration session are specified in a file selection list 88. Permissions for the participants to save the documents, print the documents, and add annotations or markups are specified in a set of checkboxes 90*a-c*, respectively. The permitted participants may be restricted according to specified e-mail addresses by the selection of a checkbox 90*d*, and the originator may be notified by e-mail by the selection of a checkbox 90*e*.

Figure 10:
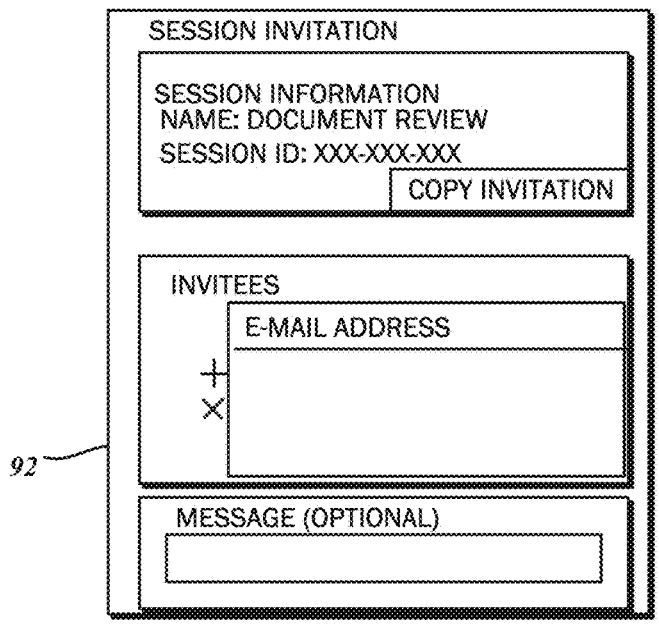
FIG. 10 is an example dialog box for inviting participants into the newly defined collaboration session.

From the perspective of the originator 14*a*, it is envisioned that a collaboration session regarding visual content may include a prefatory step of generating invitations to remote nodes such as the recipient 14*b*. The invitations are to join the collaboration session specified in the invitation. FIG. 10 illustrates an example dialog box 92 in which e-mail addresses of invited participants can be entered. In this situation, the invited participants are sent an e-mail at the specified addresses/accounts by the collaboration server 12. Alternatively, a specific link to the collaboration session may be generated by clicking a copy invitation button. It is contemplated that this link may be in the form of a Uniform Resource Identifier (URI) specifying the network address of the collaboration server 12, along with the unique session identifier mentioned above. The link may be in any other suitable format that can be copied into a clipboard memory as text, and pasted on to various communications modalities such as e-mail or instant messages.

Referring now to the flowchart of FIG. 6, there is described method for archiving a collaboration session from a local node, such as originator 14*a* regarding visual content viewable by a plurality of participants on remote nodes, such as recipients 14*b* and 14*c*. After starting the collaboration session, the method from the perspective of the originator 14*a* may continue with a step 328 of transmitting the visual content to the collaboration server 12, a remote node, from the originator 14*a*, a local node. The visual content is associated with the specific collaboration session as described above. As the originator 14*a*, the authoritative version of the visual content resides thereon, and so that is the version that is propagated to the other participants via the collaboration server 12. Referring to the flowchart of FIG. 5, the method from the perspective of the collaboration server 12 continues with a step 302 of transmitting the visual content or document 62 to the client workstations 14, and in particular, to the recipient 14*b* (a first one of the plurality of nodes or workstations 14) from the collaboration server 12. Once received, the document 62 may be displayed in the workspace window 58. To the extent that there are other documents or visual content that are defined as being part of the collaboration session, such data is also propagated to the participants in the manner above. Multiple documents may be loaded in separate workspace windows 58 in a tabbed interface, or any other suitable display arrangement known in the art.

Figure 11:
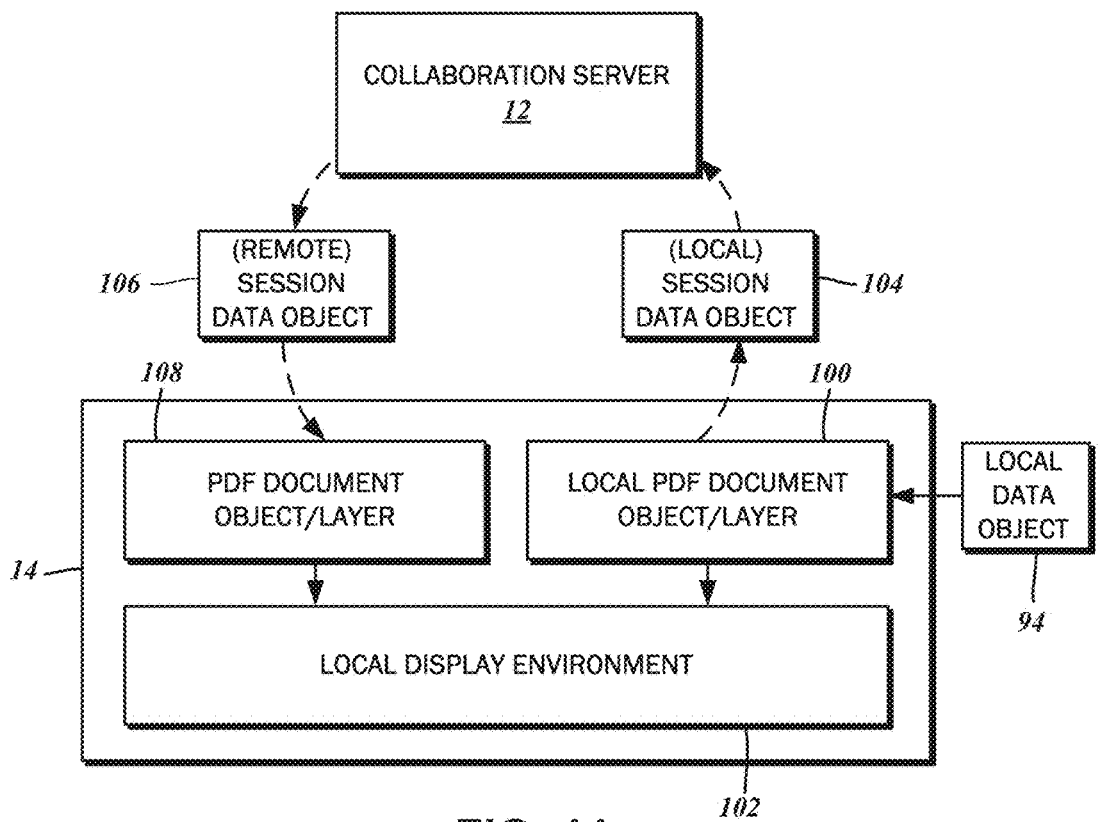
FIG. 11 is a block diagram illustrating the different layers of data objects associated with the collaboration session including a local document layer, a document layer, and a local display environment.

With reference to the block diagram of FIG. 11 and the flowchart of FIG. 6 the method from the perspective of the originator 14*a* includes a step 330 of receiving a local data object associated with the visual content or document 62 by the originator 14*a*. The visual content or document 62 is displayed at the originator 14*a* in accordance with a set of local view parameters particular to the originator 14*a* of the local data object. It is contemplated that the user associated with the originator 14*a* may make many adjustments and changes the view parameters over the course of the collaboration session.

The method from the perspective of the originator 14*a* may continue with a step 332 of transmitting to the collaboration server 12 a first multimedia data stream associated with the originator 14*a*. In this regard, the first multimedia data stream may include sounds and images from adjacent the originator 14*a*, such as audio and video of the user speaking during the collaboration session. Referring to the flowchart of FIG. 5, the method from the perspective of the collaboration server 12 continues with a step 304 of receiving at the collaboration server 12 he first multimedia data stream associated with the originator 14*a*.

The method from the perspective of the originator 14*a* may continue with a step 334 of transmitting to the collaboration server 12 from the originator 14*a* an annotation data object associated with an annotation, such as annotation 96, to the visual content in timed correlation to a first time reference within the first multimedia data stream. More particularly, with reference to FIG. 4, this may involve receiving user input via the graphical user interface 46 corresponding to the placement of an annotation 96 on the document 62. In this regard, the term local data object is understood to include the annotation 96, among other types of objects that can be associated with the document 62. By way of example only, the annotation 96 is a line with an arrow tip, and placement may begin with navigating a mouse cursor to a desired starting location 97 within the document 62, clicking, and then dragging the cursor to a desired ending location 98. As indicated above, there are many other types of annotations that may be placed on the document 62. The annotation data object may be generated in response to user input associated with placement of the annotation in relation to the visual content locally at the originator 14*a*.

When the annotation 96 is placed on the document 62, the workspace window 58 has a particular set of view parameters that defines the way in which the document 62 is displayed on the local node or workstation that receives the local data object. These include client workstation-level settings such as the dots-per-inch settings of the display monitor 20. Additionally these may include graphical user interface-specific settings such as the width and height of the main window 48 or the workspace window 58, the zoom factor of the document 62 as displayed in the workspace window 58, and the page or document rotation settings. The view of the document 62 as navigated to by the user are also contemplated to be view parameters, and includes vertical and horizontal offset from a known anchor point (center, upper left corner, etc.) of the document 62, the page number currently displayed, and the display type, or how the document 62 is displayed within the workspace window 58. These include fit width, where the size of the contents of the document 62 are enlarged to an extent where the width of the document 62 fits the entirety of the width of the workspace window 58, as well as fit page, where the contents of a single page of the document 62 fits within the confines of the workspace window 58, and continuous mode, where consecutive pages of the document 62 are rendered as a single sheet. These and other display types for the document 62 as shown on the workspace window 58 are also contemplated. It is understood that at any given point in time when a user input is received, and particularly when the annotation 96 is placed on the document 62, there is an associated set of view parameters that defines the way the document 62 is shown at that instant. Where the document 62 or visual content is three-dimensional (3D) content, the view parameter may also include a 3D transformation matrix that would allow for the replication of a same view by others at their respective workstation 14 or node such as by the recipient 14*b*. As will be described in greater detail, various embodiments of the present disclosure contemplate the transfer of these view parameters to other workstations or nodes, such as the recipient 14*b*, so that the view on the originator 14*a* is substantially replicated thereby.

With reference to the block diagram of FIG. 11, the annotation 96 or local data object 94 is placed into a local document object or layer 100. It is understood that any local data object 94 placed in the local document object/layer 100 are editable by the local user, and new local data objects may be added as desired. Additionally, existing local data objects may be deleted from the local document object/layer 100. The local document object/layer 100 is displayed in the local display environment 102 that includes the document 62 that is displayed in accordance with the set of view parameters as discussed above. From the local data object 94, a local session data object 104 may be generated. The local session data object 104 is then transmitted to the collaboration server 12. This transmission is understood to occur over standard web service protocols and bindings. In this regard, from the perspective of the collaboration server 12, the method further includes a step 306 of receiving at the collaboration server 12 from the originator 14*a* the annotation data object associated with an annotation to the visual content in timed correlation to a first time reference within the first multimedia data stream.

The method from the perspective of the originator 14*a* further may include a step 336 of transmitting to the collaboration server 12 from the originator 14*a* view parameters of originator 14*a* in timed correlation to the first time reference. In this regard the data regarding the particular view of the originator 14*a* at the time the annotation is generated or created is transmitted. Correspondingly, from the perspective of the collaboration server 12, the method further includes a step 308 of receiving at the collaboration server 12 from the originator 14*a* the view parameters of the originator 14*a* in timed correlation to the first time reference.

From the perspective of the originator 14*a*, the method further includes a step 338 of generating a session data object from the local data object on the local node. The session data object including the first multimedia data stream, the annotation data object and the view parameters. To propagate the local data object 94 to the other participating nodes including the recipient 14*b*, the method may have a step 340 of transmitting the session data object and a broadcast request to the remote collaboration server 12. The broadcast request is specifically associated with the transmitted session data object and the transmitted session data object being stored in a session record as a first session record entry generated therefrom. The session record includes a plurality of session record entries including the generated first session record entry and being retrievable by the local node for playing back the collaboration session in sequence with the session record entries.

The step of transmitting the local session data object 104 has a corresponding step from the perspective of the collaboration server 12, which involves receiving a session data object from the originator 14*a*. The set of view parameters as existing at the time of receiving the local data object 94 is included in the local session data object 104. Following receipt of the local session data object 104, from the perspective of the collaboration server 12, the method may include a step 310 of generating a first session record entry associated with the received first multimedia data stream, the annotation data object, and the view parameters. From the perspective of the collaboration server 12, the method may further include a step 312 of storing the generated first session record entry into a session record specific to the collaboration session and residing on the collaboration server 12. The session record includes a plurality of session record entries including the generated first session record entry. The session record is retrievable by any one of the participant nodes for playing back of the collaboration session in sequence with the session record entries. In various embodiments, each of the session record entries received in the course of the collaboration session is stored in connection with the session parameters mentioned above such as the name of the session, invited participants, and so forth. The method may further include a step 314 of transmitting the first session record entry from the collaboration server 12 to one or more of the other ones of the plurality of participant nodes, such as recipient 14*b*.

The foregoing examples have been primarily in the context of session data objects with annotations that are added to the document 62, but it is expressly contemplated that session data objects can include text or chat messages that are exchanged amongst the client workstations 14. As an example, in a record sub-window 72 (as described in further detail below) the ninth line of the inventory listing shows that the user "djacob" broadcasted a text message "No." Although the examples above involve the derivation of the textual descriptions shown in the inventory listing from the annotations in the received session data objects, it is also contemplated that the descriptions themselves are transmitted as text messages, with the annotations being included in that text message. Based upon the present disclosure, any number of different implementations may be utilized. Such text messages are also understood to be accompanied by the set of view parameters. In addition to text messages and annotations, the session data objects may include pre-recorded audio or video messages, or any other type of content that may be displayed or otherwise reproduced on the client workstation 14.

In this regard, from the perspective of the collaboration server 12, the method may optionally include a step 318 of receiving at the collaboration server 12 from the any one of the participant nodes, such as the originator 14*a*, a broadcast chat message data object associated with a broadcast chat message in timed correlation to a second time reference within the multimedia data stream. The broadcast chat message data object is generated in response to user input associated with entry of chat text separate from the visual content locally at the originator 14*a*. The method may include a step 320 of receiving at the collaboration server 12 from the originator 14*a* second view parameters of the originator 14*a* in timed correlation to the second time reference. This may also include text chat data that can be typed in to the record sub-window 72 by the user. As noted above, chat text data may also be associated with the local document object or layer 100, though it is to be separately displayed in the record sub-window 70. According to one embodiment, such chat text data is not editable once entered, but it is also contemplated that edits and deletions may be made in the same manner as the annotation 96 if desired. The local data object 94 is stored together with the document 62 for subsequent retrieval and display.

It is contemplated that multiple attendees may attend a session with each generative multimedia data streams, such as it the case with multiple attendees each with their own respective web cam feeds. From the perspective of the collaboration server 12, the method may optionally include a step 322 of receiving at the collaboration server from a second one of the plurality of participant nodes, such as the recipient 14*b*, a second multimedia data stream. The method may further include a step 324 of generating a second session record entry associated with the received second multimedia data stream. The method may further include a step 326 of storing the generated second session record entry into the session record specific to the collaboration session and residing on the collaboration server. The session record includes a plurality of session record entries including the generated first session record entry and the generated second session record entry. The session record is retrievable by any one of the participant nodes for playing back of the collaboration session in sequence with the session record entries.

In a step 314, the session record entry, which includes the local session data object 104 from which it is derived, and the associated view parameters are transmitted to the other participant nodes, including the recipient 14*b* and any other client workstations 14 that are a part of the collaboration session. From the perspective of the recipient 14*b*, there is a corollary step 402 of receiving that session data object. In accordance with one embodiment of the present disclosure, this step is accomplished over the web service connection. With reference again to the block diagram of FIG. 11, considering that the session data object is not, by definition, local to the second client workstation 14*b*, it is designated as a remote session data object 106.

Generally, the recipient 14*b* updates the graphical user interface 46 to reflect the received remote session data object 106. Continuing with the example sequence above, the line annotation 96 added to the document 62 on the originator 14*a* is transferred to the collaboration server 12 by way of the local session data object 104. The corresponding remote session data object 106 includes the line annotation 96, which is displayed on the recipient 14*b* in the same or substantially the same way as in the originator 14*a*. As best illustrated in the block diagram of FIG. 11, the received remote session data object 106 is stored in a document object/layer 108 that is independent of the local document object/layer 100. It is understood that all received remote session data objects 106 may be placed in the document object/layer 108. Any annotations 96 in the document object/layer 108 are locked to the local user, and cannot be edited or deleted. As will be described more fully below, the document object/layer and the local document object/layer 100 are overlaid on the document 62 as displayed in the workspace window 58. The annotations can be overlaid or displayed on the document 62 immediately upon receipt into the document object/layer 108.

After receiving the remote session data object, the method may include a step of generating an inventory of all remote session data objects, which includes the most recently received remote session data object 106, as well as other prior received remote session objects. To the extent that remote session data objects were received from other nodes besides the originator 14*a*, those would be included in the inventory as well. This part may take place at the very beginning of establishing the collaboration session with each newly received remote session data object being added to the inventory, instead of refreshing the entirety of the inventory each time.

Figure 13:
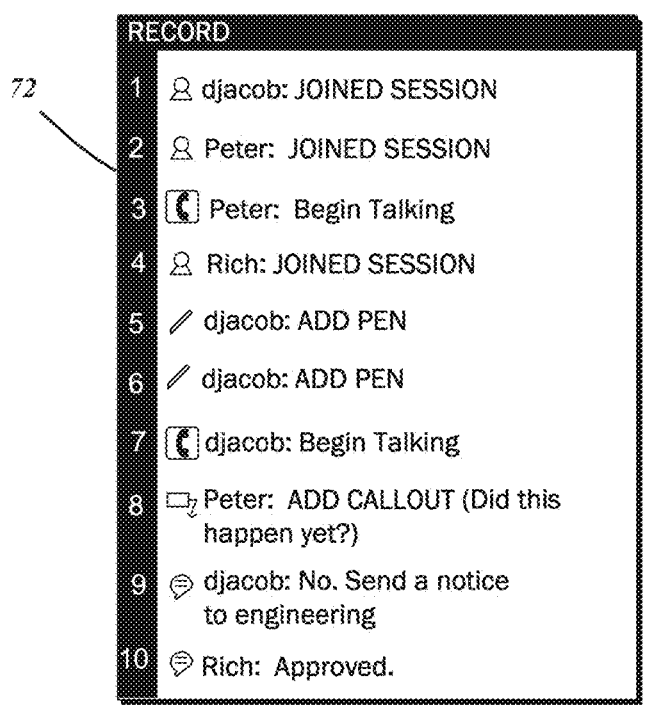
FIG. 13 is one visualization of an inventory of received session data objects in a record sub-window.

In one contemplated embodiment, the inventory may be visualized in the aforementioned record sub-window 72 in the graphical user interface 46. A further detailed view of an inventory listing in the record sub-window 72 is shown in FIG. 13. The inventory listing may include a sequence identifier as represented by sequential numbers that designate the order in which the remote session data objects, among others, were received. This embodiment also contemplates that other actions besides the adding of annotations is recorded, including participants logging in to or joining the session, and detected events where a participant is determined to have begun speaking, and so forth. The various session data objects are chronologically listed. However, it is understood that certain events may persist temporally during the collaboration session and may overlap with other session data objects. In other words it is understood that events giving rise of the various session data objects may transpire simultaneously.

In the exemplary inventor listing, the users "djacob," "Peter" and "Rich" have joined the session, as indicated in lines 1, 2 and 4. As mentioned above, in the example sequence, a line is added by the originator 14a. This is indicated in the inventory listing as "ADD PEN" in lines 5 and 6, and is noted as being initiated by the user "djacob." An icon representative of the type of event that occurred, or session data object is also provided; in this instance, it is a pen-shaped object. For other annotations, such as the callout box that was added by user "Peter" indicated in line 8, the corresponding icon of a callout box is shown. Furthermore, because a callout box is capable of accepting supplemental text, that is also provided in the listing: "Did this happen yet?"

In addition, events associated with the received multimedia data streams may be used to create and log various session data objects. For example, line 3 and 7 indicate when "Peter" and "djacob" were detected to have begun respectively talking. It is contemplated that one of ordinary skill in the art may utilize any of those well known methods and software processes to detect or otherwise infer when a recorded person is speaking. In this regard, the method may include detecting audible characteristics in the audio data stream in comparison to a threshold value associated with vocal sounds or signals. Upon such a detection, the method may include establishing a time reference in relation to the detected audible characteristics. Detection of a silence or lack of talking when an attended has ceased talking for some predetermined interval may also be used to generate a data object. Such detections may be accomplished at the collaboration server 12 subsequent to receipt of the associate multimedia data stream, or locally processed at the workstation 14 and such data are used to create additional data objects. A graphical indicator may be provided to indicate when one or more of the attendees is detected to have been talking at any given time during a playback of a collaboration session. For example, in the follow selection feature 128, the icon for each attendee may be highlighted or change in color during time intervals when the attendees are detected to have been talking.

According to another aspect of the present disclosure, there is provided a method for accessing an archived collaboration session from a local node regarding visual content viewable by a plurality of users on remote nodes, such as recipient 14b.

With reference to the call archive sub-window 70, the method may include a perfunctory step of selecting a particular archived collaboration session to assess. In this example, there are icons 110, 112 for two archived collaboration sessions. The recipient 14b may select from the icon 110 denoted "Concrete Call" and the icon 112 denoted "Plumbing Issue." In this example, the icon 112 has been selected or may have been provided as default selection. Other information related to a particular archived collaboration session may be displayed, such as date, attendees, project, or other data fields, as represented by various labels, symbols or the like. The archive sub-window 70 may feature common A/V player features such as various controls related to the play back of the multimedia data stream content. A player bar 114 may be used to graphically represent the multimedia data stream of a particular attendee or combined data stream of the attendees from the associated archived collaboration session. As is the commonly understood graphical convention, the width of the player bar 114 corresponds to a total time length of the multimedia data stream, the horizontal length of the shaded portion extending from left to right corresponds to that portion of the multimedia data stream that has already temporally passed, and the divider 116 corresponds to that portion of the multimedia data stream that is currently being played back or otherwise paused. It is contemplated that additional commonly understood graphics may be provided related to time stamping, time elapsed within the overall multimedia data stream, total time length and so forth. Such graphics would not only provide visual information but also provide player controls as well. It is contemplated that such player functionality and related software programming may be chosen from those which are well known to one of ordinary skill in the art. The player may include a play button 118, a rewind button 120, a pause button 122, a forward button 124 and a volume control 126. While this example only contemplates audio playback, it is contemplated a video player may include one or more sub-windows to display video images associate with the various associated multimedia data streams. The call archive sub-window 70 may further feature a follow selection feature 128 that allows for viewing using the particular view parameters associated with a selected attended as is discussed further below.

Referring to the flowchart of FIG. 7, from the perspective of the recipient 14b, the method includes a step 342 of receiving the visual content by the recipient 14b from the collaboration server 12. The visual content is associated with the archived collaboration session. The method further includes a step 344 of receiving a first session data object at the recipient 14b from the collaboration server 12. The first session data object is associated with the originator 14a and being derived from a corresponding session record entry of a session record specific to the archived collaboration session and residing on the collaboration server 12.

The method further includes a step 346 of generating on the recipient 14b an inventory of the received first session data object and other prior received session data objects from other remote nodes in the archived collaboration session. The first session data object includes a first multimedia data stream, an annotation data object associated with an annotation to the visual content in timed correlation to a first time reference within the first multimedia data stream, and view parameters of the originator 14a in timed correlation to the first time reference. The method further includes a step 348 of receiving a selection of the first session data object from the inventory by the recipient 14b. This may be accomplished by clicking on one of the session data objects as represented in the inventory listing. It is noted that the session data object may be selected independently of the initial transfer of the local session data object 104 to the collaboration server 12 refers to asynchronous collaboration. However, in some embodiments, it is also envisioned that the selection may occur without user intervention, upon receipt of the session data object. This is referred to as synchronous collaboration. It will be appreciated that the above-described method provides both asynchronous and synchronous collaboration on visual content from the same interface, specifically the inventory listing.

The method further includes a step 350 of displaying the visual content on the recipient 14b in timed correlation in relation to the first time reference. As such, the associated multimedia data feed may be played back in reference to when certain events occurred that generated the various data objects. To aid in obtaining a better understanding of the context in which a certain data object was generated or create, the displaying of the visual content of a selected first session data object may be temporally prior to the first time reference. In this regard, when playing back the associated audio feed of the multimedia data stream, conversations between, by or among the session participants may be listened to leading up the occurrence of the generation of the associated data object.

For each of the session data objects included in the inventory listing, there is an associated set of view parameters of the workstation 14 associated with each one of such session data objects, at the time it is generated. Therefore, upon a selection of one of the session data objects from the inventory listing, the associated set of view parameters may be then applied to the recipient 14b. The various individual view parameters that may be included such as DPI settings and the like have been described, so they will not be described again here. The recipient 14ba may display allow for view of the visual content from the perspective of the particular workstation 14 that generated with associated data object.

The displaying of the visual content may include doing so substantial conformity with the view parameters associated with the data object. Essentially, this means that the workspace window 58 of the recipient 14b may be updated to appear as close as possible to the workspace window 58 of the originator 14a. For example, if the view is zoomed in to a particular section of the document 62, then that zoomed view will be replicated. Thus, the chat record, as well as the record of annotations being added, is capable of tracking or following the view of the originator 14a as the collaboration session progresses, with that view being replicated on the recipient 14a-c. The recipient 14b-c thus "see" the document as "seen" by the originator 14a, providing full visual context to the circumstances in which certain audible discussions, conversations, text comments or annotations were made.

Figure 14:
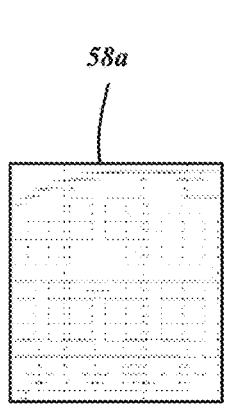
FIG. 14 is an example of a first workspace window associated with an originator.
Figure 15:
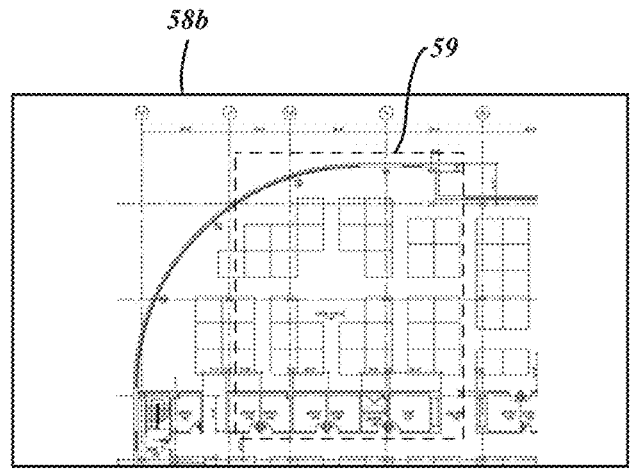
FIG. 15 is an example of a second workspace window associated with a recipient illustrating and adjusted view that is in substantial conformity with view parameters of the first workspace window shown in FIG. 14.

FIG. 14 provides an illustrative example of a first workspace window 58a that has a particular view as defined by the aforementioned view parameters, and has a certain predefined size. FIG. 15 provides an illustrative example of a second workspace window 58b that is replicated from the first workspace window 58a, but has a larger predefined size. In this instance, where the second workspace window 58b represents a display on the recipient 14b, it is adjusted to match the view on the first workspace window 58a, accounting for the originator's DPI settings and screen resolution settings. In accordance with one embodiment, the second workspace window 58b shows at least as much of the document 62 as shown in the first workspace window 58a, but likely see more because there is a larger area within which the document 62 is displayed. As shown in the second workspace window 58b, a portion 59 of the document 62 corresponds to the view shown in the first workspace window 58a.

In addition to designating a specific location on the document 62 to which the workspace window 58 is focused, it is understood that the set of view parameters includes a designation of a particular document amongst others that are part of the collaboration session. Thus, if one of the session data objects pertains to a different document, then the workspace window 58 is loaded with that different document, and the view is adjusted to conform to the remaining view parameters in the same manner as previously described.

As indicated above, an annotation in the received remote session data object 106 may be placed into the document object/layer 108 immediately upon receipt and displayed, per step 409. This is understood to be independent of adjusting the display of the visual content to be in substantial conformity to the associated set of view parameters, but in accordance with various other embodiments, it may be generated upon receipt of the selection of a specific one of the session data objects. Along these lines, because the inventory is arranged in the order received, a later-added annotation or session data object may not be displayed if an earlier received annotation or session data object is selected. For example, if the fifth element in the inventory listing is selected, then only the annotation corresponding to the first "ADD PEN" descriptor is displayed. The other annotations corresponding to the second "ADD PEN" descriptor in the sixth line and to the "ADD CALLOUT" descriptor in the eighth line will not be displayed. However, if the sixth element in the inventory listing is selected, then the view parameters describing the sixth element will be displayed.

Figure 12:
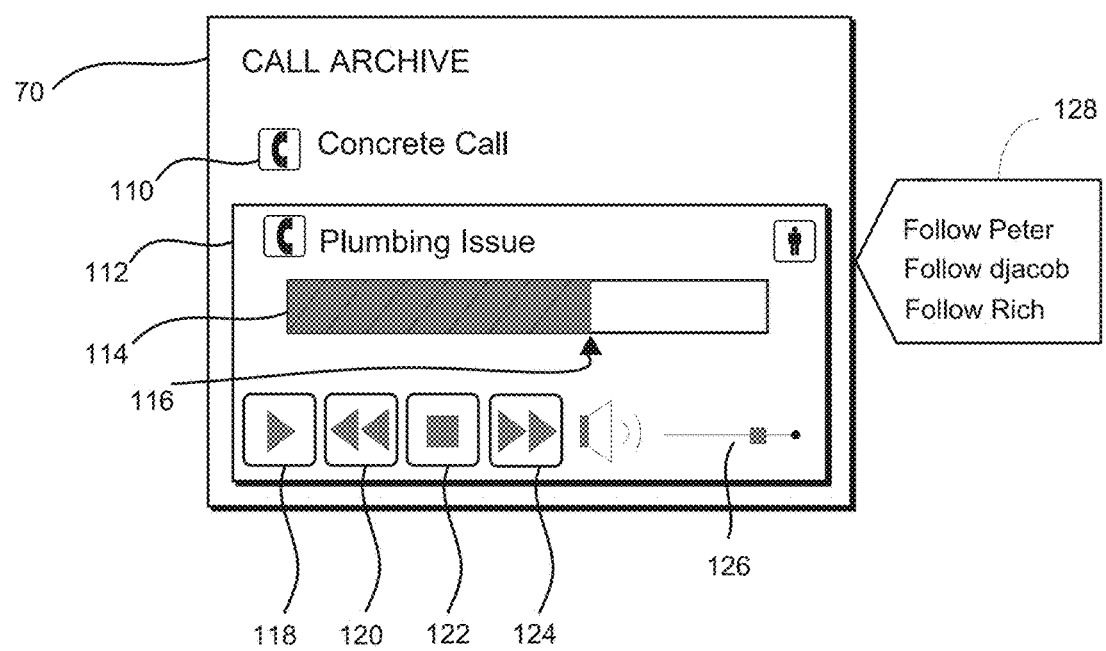
FIG. 12 is one visualization of a multimedia play back of a session record in a call sub-window.

Referring again to FIG. 12, there is provided a follow selection feature 128. The items listing within the follow selection feature as depicted in this example correlate to the session attendees as labeled "Peter," "djacob" and "Rich." Section of any of these items would result in the recipient 14b receiving those view parameters associated with the selected attendee that corresponds to the timed relationship to the displaying/replaying of the archived visual content irrespective of whether a different data object been selected or is associated with a given time reference. In other words, the follow section feature 128 allows a recipient 14b to view the visual content being played back from the perspective of any of the various listed attendees at any point in during the archive session collaboration. This feature allows for a great understanding of the context of what the various attendees were seeing when various events occurred as represented by the generation of the various data object discussed above, even though they may not have been the originator 14a of the particular generated data object.

From the perspective of the collaboration server 12, as well as the recipient 14b, the respective methods contemplate an optional step of generating a session report. FIG. 16 shows an example of a session report 130. In further detail, there is a section 132 listing the attendees or participants of the session, here listed as user "djacob," "Peter" and "Rich." Optionally, the users' e-mail address may be included. There is also a section 134 listing the documents or visual contents that are a part of the collaboration session to which the session report 130 pertains. In the record section 136, the inventory listing of the record sub-window 72 described above in relation to FIG. 13 is replicated, and sets forth each of the session data objects that are a part of the collaboration session. Each row also includes a date column 138, a time column 140, a document identifier column 142, and a page identifier column 144. It is contemplated that the session report 130 may be is appended to the end of the document 62. To the extent that there are several documents in the collaboration session, each of those documents may be included in the session report 130. Each of the descriptors of the session objects are understood to be hyperlinked as is the case with the inventory listing. Thus, by selecting one of the session objects, the workspace window 58 displaying the document 62 is adjusted to that specified by the corresponding set of view parameters. It is also contemplated, however, that the session report 114 is separately generated from the document 62.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A method for archiving a collaboration session regarding an electronic document, the method comprising:
    establishing a collaboration session from a collaboration server with a plurality of participant nodes;
    transmitting the electronic document to the participant nodes from the collaboration server;
    receiving, at the collaboration server, a first multimedia data stream associated with a first one of the plurality of participant nodes;
    receiving, at the collaboration server from the first one of the plurality of participant nodes, an annotation data object, the annotation data object being correlated with a first time reference within the first multimedia data stream, the annotation data object being representative of an annotation added to the electronic document;
    receiving, at the collaboration server from the first one of the plurality of participant nodes, first view parameters of the first one of the plurality of participant nodes, the first view parameters being correlated with the first time reference and defining a manner in which the electronic document and the annotation were displayed in a workspace window of the first one of the plurality of participant nodes at the first time reference;
    generating a first session record entry associated with the received first multimedia data stream, the annotation data object, and the first view parameters;
    storing the generated first session record entry into a session record that is specific to the collaboration session and resides on the collaboration server, the session record including a plurality of session record entries including the generated first session record entry, the session record being retrievable for playing back of the collaboration session in sequence with the session record entries;
    transmitting the first session record entry from the collaboration server to one or more of the other ones of the plurality of participant nodes, wherein selection of the transmitted first session record entry among the plurality of session record entries in the session record, by a user of the one or more of the other ones of the plurality of participant nodes, triggers i) a replay of the first multimedia data stream from a point temporally prior to the first time reference correlated with the annotation data object, the point temporally prior being based on a context associated with the annotation data object and ii) a display of the electronic document and the annotation based on the first view parameters.

2. The method of claim 1 wherein the multimedia data stream is an audio data stream.

3. The method of claim 1 wherein the electronic document is a portable document format (PDF) document.

4. The method of claim 1 wherein the annotation data object is generated in response to user input associated with placement of the annotation in relation to the electronic document locally on the first one of the plurality of participant nodes.

5. The method of claim 4 wherein a one of the first view parameters is selected from a group consisting of: dots-per-inch settings of a display device for the first one of the plurality of participant nodes, window width and height of the electronic document as displayed on the first one of the plurality of participant nodes, zoom factor of the electronic document as displayed on the first one of the plurality of participant nodes, rotation of the electronic document as displayed on the first one of the plurality of participant nodes, offset of the electronic document as displayed on the first one of the plurality of participant nodes, document page number of the electronic document as displayed on the first one of the plurality of participant nodes, display type of the electronic document as displayed on the first one of the plurality of participant nodes, and a 3D transformation matrix.

6. The method of claim 1 further includes:
    receiving at the collaboration server from the first one of the plurality of participant nodes a broadcast chat message data object associated with a broadcast chat message correlated with a second time reference within the multimedia data stream.

7. The method of claim 6 further includes:
    receiving at the collaboration server from the first one of the plurality of participant nodes second view parameters of the first one of the plurality of participant nodes correlated with the second time reference.

8. The method of claim 6 wherein the broadcast chat message data object is generated in response to user input associated with entry of chat text separate from the electronic document locally on the first one of the plurality of participant nodes.

9. The method of claim 1 further includes:
    receiving a second multimedia data stream at the collaboration server associated with a second one of the plurality of participant nodes.

10. The method of claim 9 further includes:
    generating a second session record entry associated with the received second multimedia data stream; and
    storing the generated second session record entry into the session record that is specific to the collaboration session and resides on the collaboration server, the session record including a plurality of session record entries including the generated first session record entry and the generated second session record entry, the session record being retrievable by any one of the participant nodes for playing back of the collaboration session in sequence with the session record entries.

11. The method of claim 1 wherein the multimedia data stream includes an audio data stream and the method includes:
    detecting audible characteristics in the audio data stream in comparison to a threshold value associated with vocal sounds.

12. The method of claim 1, further comprising:
    receiving, at the collaboration server from a second one of the plurality of participant nodes, second view parameters of the second one of the plurality of participant nodes, the second view parameters being correlated with the first time reference, the second view parameters defining the manner in which the electronic document and the annotation were displayed in a workspace window of the second one of the plurality of participant nodes at the first time reference; and
    transmitting the second view parameters from the collaboration server to the one or more of the other ones of the plurality of participant nodes upon the user selecting an identifier associated with the second one of the plurality of participant nodes, wherein the selection of the identifier associated with the second one of the plurality of participant nodes causes the electronic document and the annotation to be displayed based on the second view parameters.

13. A method for archiving a collaboration session from a local node regarding electronic document viewable by a plurality of users on remote nodes, the method comprising:
transmitting the electronic document to a remote collaboration server from the local node, the electronic document being associated with the collaboration session;
receiving a local data object associated with the electronic document on the local node, the electronic document being displayed on the local node in accordance with a set of local view parameters particular to the receipt of the local data object; transmitting, to the collaboration server, a first multimedia data stream associated with the local node;
transmitting, to the collaboration server from the local node, an annotation data object, the annotation data object being correlated with a first time reference within the first multimedia data stream, the annotation data object being representative of an annotation added to the electronic document;
transmitting, to the collaboration server from the local node, first view parameters of the local node, the first view parameters being correlated with the first time reference and defining a manner in which the electronic document and the annotation were displayed in a workspace window of the local node at the first time reference;
generating a session data object from the local data object on the local node, the session data object including the first multimedia data stream, the annotation data object, and the first view parameters; and
transmitting the session data object and a broadcast request to the remote collaboration server from the local node, the broadcast request being specifically associated with the transmitted session data object and the transmitted session data object being stored in a session record as a first session record entry generated therefrom, the session record including a plurality of session record entries including the generated first session record entry and being retrievable by the local node for playing back the collaboration session in sequence with the session record entries, wherein selection of the first session record entry among the plurality of session record entries in the session record, by a user of the local node, triggers i) a replay of the first multimedia data stream from a point temporally prior to the first time reference correlated with the annotation data object and ii) a display of the electronic document and the annotation based on the first view parameters.

14. The method of claim 13 wherein the annotation data object is generated in response to user input associated with placement of the annotation on the electronic document locally on the local node.

15. The method of claim 13 wherein a one of the first view parameters is selected from a group consisting of: dots-per-inch settings of a display device for the local node, window width and height of the electronic document as displayed on the local node, zoom factor of the electronic document as displayed on the local node, rotation of the electronic document as displayed on the local node, offset of the electronic document as displayed on the local node, document page number of the electronic document as displayed on the local node, display type of the electronic document as displayed on the local node, and a 3D transformation matrix.

16. A method for accessing an archived collaboration session from a local node regarding electronic document viewable by a plurality of users on remote nodes, the method comprising:
receiving the electronic document on the local node from a remote collaboration server, the electronic document being associated with the archived collaboration session;
receiving a first session data object on the local node from the remote collaboration server, the first session data object being associated with a first one of the remote nodes and being derived from a corresponding session record entry of a session record that is specific to the archived collaboration session and resides on the collaboration server;
generating on the local node an inventory of the received first session data object and other prior received session data objects from other remote nodes in the archived collaboration session, the first session data object including:
a first multimedia data stream,
an annotation data object, the annotation data object being correlated with a first time reference within the first multimedia data stream, the annotation data object being representative of an annotation added to the electronic document, and
first view parameters of the first one of the remote nodes, the first view parameters being correlated with the first time reference and defining a manner in which the electronic document and the annotation were displayed in a workspace window of the first one of the remote nodes at the first time reference;
receiving a selection of the first session data object among a plurality of session data objects including the first session data object and the other prior received session data objects in the inventory on the local node; and
in response to receiving the selection of the first session data object, triggering:
a replay of the first multimedia data stream from a point temporally prior to the first time reference correlated with the annotation data object, and
a display of electronic document and the annotation based on the first view parameters.

17. The method of claim 16, further comprising:
responsive to receiving a selection of an identifier associated with a second one of the remote nodes, displaying the electronic document and the annotation based on second view parameters of the second one of the remote nodes, the second view parameters being correlated with the first time reference and defining the manner in which the electronic document and the annotation were displayed in a workspace window of the second one of the remote nodes at the first time reference.

18. The method of claim 16 wherein a one of the first view parameters is selected from a group consisting of: dots-per-inch settings of a display device for the first one of the remote nodes, window width and height of the electronic document as displayed on the first one of the remote nodes, zoom factor of the electronic document as displayed on the first one of the remote nodes, rotation of the electronic document as displayed on the first one of the remote nodes, offset of the electronic document as displayed on the first one of the remote nodes, document page number of the electronic document as displayed on the first one of the remote nodes, display type of the electronic document as displayed on the first one of the remote nodes, and a 3D transformation matrix.

* * * * *